(12) United States Patent
Hyman

(10) Patent No.: US 12,055,368 B2
(45) Date of Patent: *Aug. 6, 2024

(54) ANTI-DRONE WEAPON

(71) Applicant: IXI Technology Holdings, Inc., Yorba Linda, CA (US)

(72) Inventor: Daniel Hyman, Long Beach, CA (US)

(73) Assignee: IXI Technology Holdings, Inc., Yorba Linda, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/852,251

(22) Filed: Jun. 28, 2022

(65) Prior Publication Data

US 2022/0397375 A1 Dec. 15, 2022

Related U.S. Application Data

(63) Continuation of application No. 16/150,942, filed on Oct. 3, 2018, now Pat. No. 11,371,812.

(60) Provisional application No. 62/567,713, filed on Oct. 3, 2017.

(51) Int. Cl.
*F41H 13/00* (2006.01)
*F41H 11/02* (2006.01)
*G01S 19/39* (2010.01)
*H04K 3/00* (2006.01)

(52) U.S. Cl.
CPC ......... *F41H 13/0075* (2013.01); *F41H 11/02* (2013.01); *H04K 3/224* (2013.01); *H04K 3/90* (2013.01); *G01S 19/39* (2013.01)

(58) Field of Classification Search
CPC ..... F41H 13/0075; F41H 11/02; H04K 3/224; H04K 3/90; G01S 19/39
See application file for complete search history.

(56) References Cited

U.S. PATENT DOCUMENTS 11,371,812 B2 * 6/2022 Hyman .................. H04K 3/224
2017/0250778 A1 * 8/2017 Stamm ..................... G08B 6/00

* cited by examiner

*Primary Examiner* — Olumide Ajibade Akonai
(74) *Attorney, Agent, or Firm* — The Watson IP Group, PLC; Jovan N. Jovanovic

(57) ABSTRACT

An anti-drone weapon having a housing and at least one antenna positioned within the housing. The at least one antenna capable of operating at a frequency at least between 400 MHz and 6 GHz. In some configurations, a power supply, processor and control circuitry and a control panel, within the housing. In some configurations, the at least one antenna includes three antenna, including, a double helical antenna, a quasi-yagi antenna and a log-periodic antenna.

14 Claims, 8 Drawing Sheets

ANTI-DRONE WEAPON

CROSS-REFERENCE TO RELATED APPLICATION

This present application is a continuation of U.S. patent application Ser. No. 16/150,942 filed on Oct. 3, 2018, entitled "ANTI-DRONE WEAPON", which claims priority from U.S. Patent Application Ser. No. 62/567,713 filed Oct. 3, 2017, entitled "Anti-Drone Weapon", the entire disclosure of which is hereby incorporated by reference in its entirety.

BACKGROUND OF THE DISCLOSURE

1. Field of the Disclosure

The disclosure relates in general to weapons, and more particularly, to an anti-drone weapon that can receive and transmit signals to detect and disrupt the operation of remotely piloted radio-controlled vehicles as well as autonomous vehicles navigating with Global Navigation Satellite Systems (GNSS) such as GPS. The device is not limited to countering Unmanned Air Systems (UASs), e.g., "drones", however, the device is particularly well-suited to disable, disrupt and/or destroy aerial targets.

2. Background Art

Increasingly, terrorist groups, foreign militaries, criminal organizations, and other groups are utilizing drones and other unmanned vehicular systems for airspace control, surveillance, and ground attack missions. Drones are readily weaponized with remotely deployed and/or detonated grenades, claymores, mortar shells, and Improvised Explosive Devices (IEDs) and have proven effective at inflicting casualties and slowing the advance of state troops, allied warfighters, and security personnel, especially in urban settings.

Problematically, most drones are small and nimble, making them hard targets for firearm-based countermeasures and other conventional kinetic assets. They are also capable of maneuvering at high altitude, reducing detection and increasing survivability. Moreover, due to their high speed and maneuverability, it is often difficult to effectively engage drones. Hundreds to thousands of rounds are typically fired to remove a single drone threat in a combat theater.

In lieu of physically hitting the drone with kinetic projectiles or airburst shrapnel, some counter-drone systems disrupt the communication between the drone and its controller (usually a remotely positioned pilot), disrupt the operation of the drone's navigation system, and/or disrupt its inertial or optical navigation and stability sensors. Such disruptions can be sufficient to cause a drone to abandon its mission, or to land, crash, or stop its movement to simplify kinetic or other conventional engagement techniques.

While other counter-drone disruption systems have been developed and released as products, there remains a need to have a highly portable and lower-power unit that can effectively disrupt communication and operation of drones and other unmanned threats.

SUMMARY OF THE DISCLOSURE

The disclosure is directed to an anti-drone weapon. The anti-drone weapon having a housing and at least one antenna positioned within the housing. The at least one antenna capable of operating at a frequency at least between 400 MHz and 6 GHz. In some configurations, a power supply, processor and control circuitry and a control panel, within the housing. In some configurations, the at least one antenna includes three antenna, including, a double helical antenna, a quasi-yagi antenna and a directed log-periodic antenna.

It is contemplated that the anti-drone weapon be fully self-contained, and have a weight that is less than 6 kg, and more preferably less than 3.6 kg.

It is contemplated that the weapon work throughout the following frequencies and frequency regions: GNSS (including GPS, GLONASS, Galileo, and BeiDou) L1, GNSS L2, 2.4 to 2.5 GHz and 5.6 to 6.0 GHz, 1250 to 1290 MHz, 870 to 928 MHz, and 420 to 460 MHz.

It is contemplated that the weapon has an effective operational range of approximately 500 to 1,000 meters to address potential threats at a tactically advantageous standoff distance. It is further contemplated that the device is able to recognize and sense drones in a range up to and including 3.2 kilometers in distance.

In some configurations, the housing further includes a stock and a barrel extending therefrom. The barrel includes a proximal end and a distal end.

In some configurations, a power supply, processor and control circuitry is maintained in one of the stock and the barrel.

In some configurations, the barrel defines a cavity, having a double helical antenna positioned with a base at the proximal end, and extending toward the distal end.

In some configurations, the double helical antenna is coupled to the barrel between the proximal and distal end through at least one of an upper mounting bracket and a lower mounting bracket.

In some configurations, the upper mounting bracket and the lower mounting bracket comprise a polymer, which is releasably coupled to at least one helix of the double helical antenna.

In some configurations, the anti-drone weapon further comprises a second antenna assembly positioned to a first side of the double helical antenna and extending between the proximal and the distal end.

In some configurations, the second antenna comprises a quasi-yagi antenna.

In some configurations, the second antenna is substantially planar.

In some configurations, the anti-drone weapon further comprises a third antenna assembly positioned to a second side of the double helical antenna.

In some configurations, the third antenna comprises a directed log-periodic antenna.

In some configurations, the third antenna is in a non-planar configuration.

In some configurations, the housing further includes a trigger and a thumbhole for the grip. A portion of the third antenna extends between the trigger and the thumbhole for the grip.

In some configurations, the first antenna operates on ranges that include GNSS (including GPS, GLONASS, Galileo, and BeiDou) L1, GNSS L2, 1250 to 1290 MHz, 2.4 to 2.5 GHz, and 5.6 to 6 GHz frequencies, the second antenna generally operates at 870 to 928 MHz frequencies and the third antenna generally operates between 420 to 460 MHz frequencies.

In some configurations, the anti-drone weapon weighs approximately 6 kilograms or less.

In some configurations, the anti-drone weapon has a range of approximately 1000 meters.

In some configurations, the housing is formed from a port case half and a starboard case half.

BRIEF DESCRIPTION OF THE DRAWINGS

The disclosure will now be described with reference to the drawings wherein.

DETAILED DESCRIPTION OF THE DISCLOSURE

Figure 1:
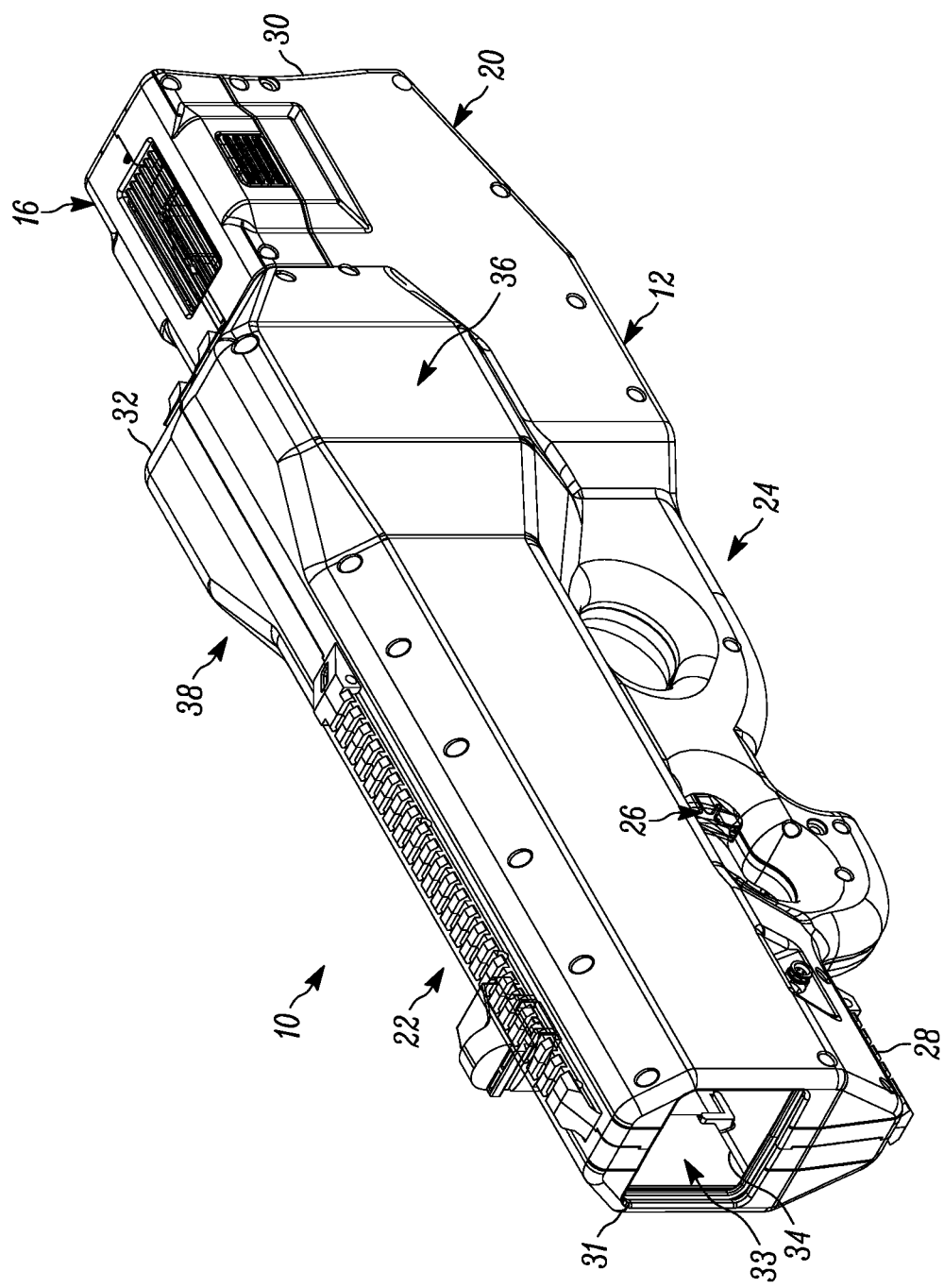
FIG. 1 of the drawings is a perspective view of the anti-drone weapon from the front end thereof.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 3:
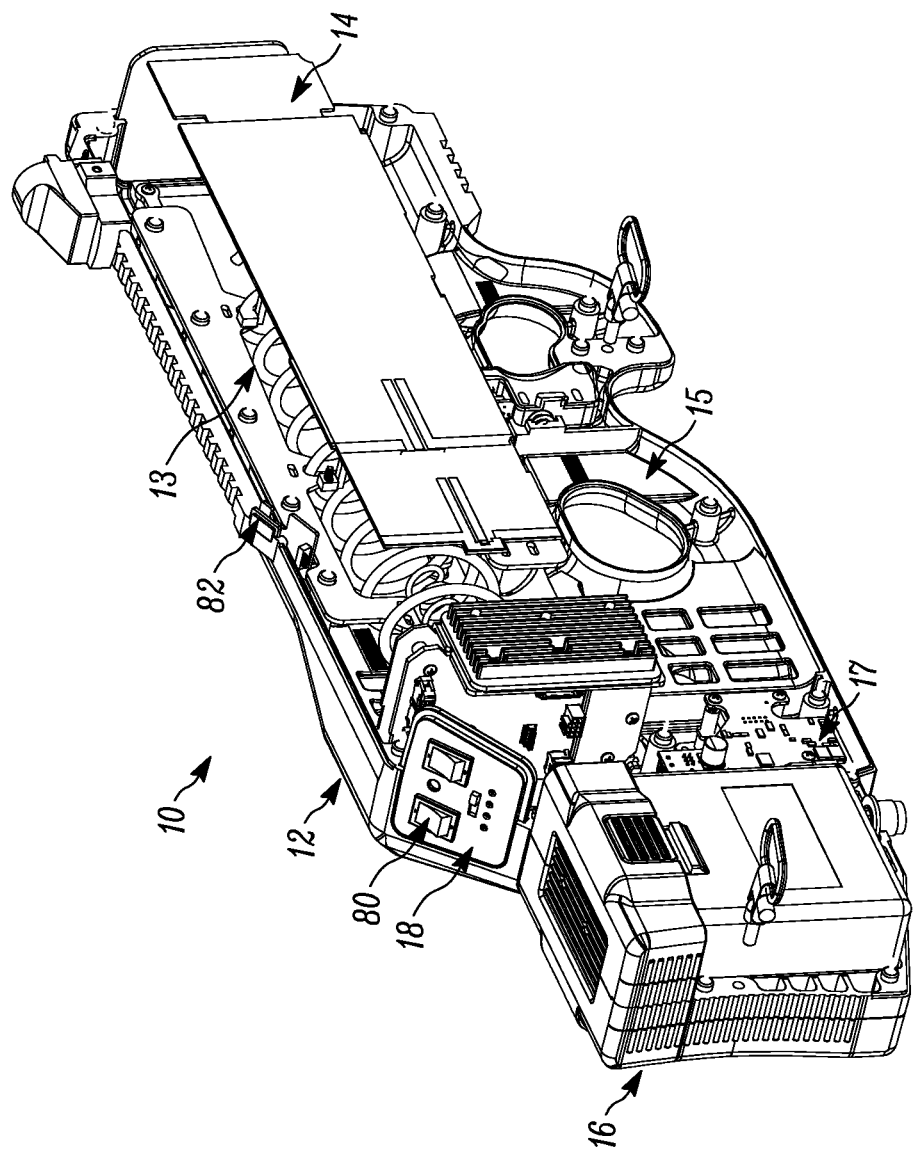
FIG. 3 of the drawings is a perspective view of the anti-drone weapon showing, in particular, having the starboard side housing removed.

Referring now to the drawings and in particular to FIGS. 1 and 3, the anti-drone weapon is shown generally at 10 and comprises housing 12, helical antenna assembly 13, second antenna assembly 14, third antenna assembly 15, power supply 16, processor and control circuitry 17, and control panel assembly 18. It is to be understood the antenna systems, power supply, and relevant circuitry are all substantially encased and protected by the housing. Further, the antenna systems all extend within the housing in such a way the independent assemblies are generally positioned proximate to one another.

Figure 2:
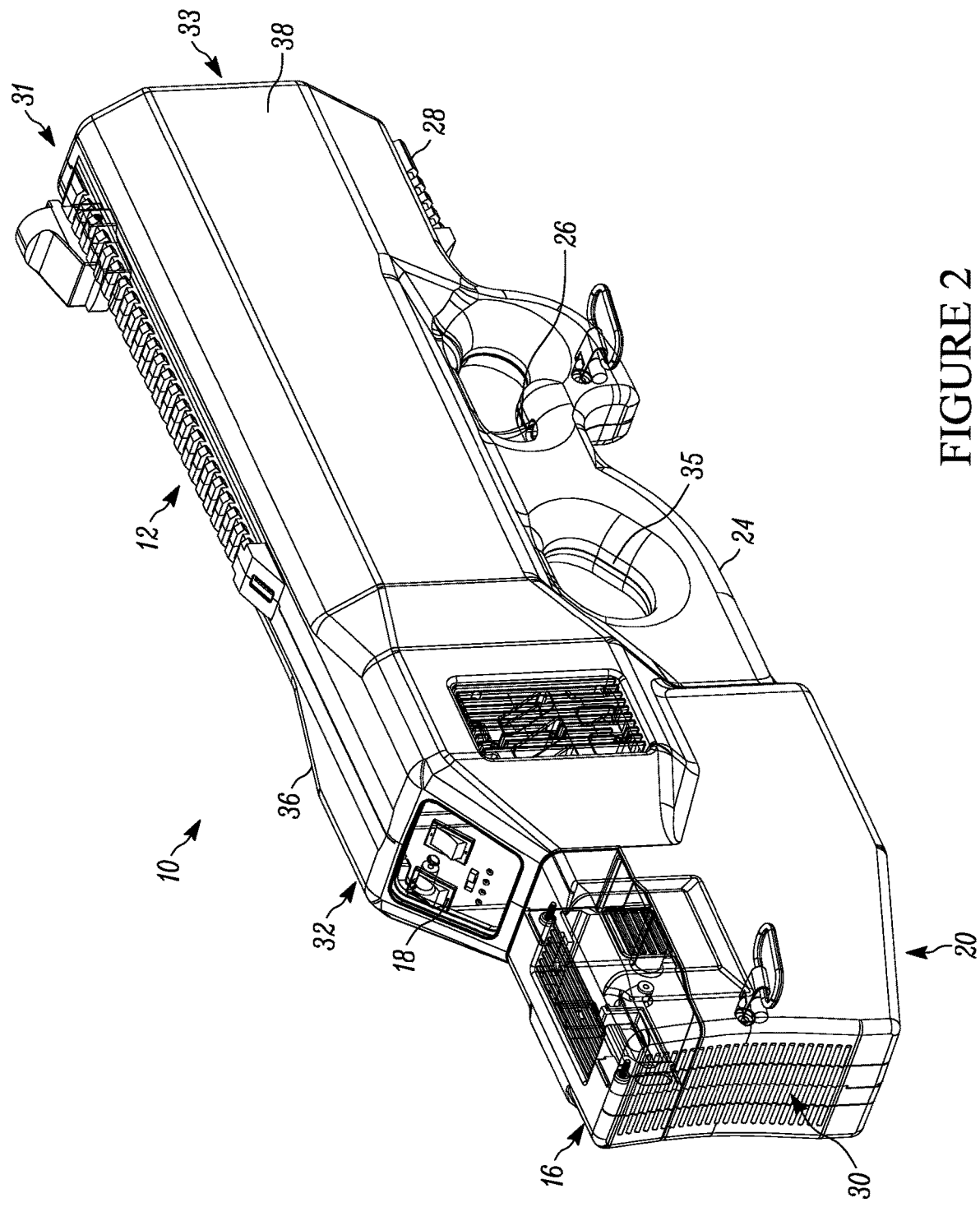
FIG. 2 of the drawings is a perspective view of the anti-drone weapon as from the back end thereof.
Figure 4:
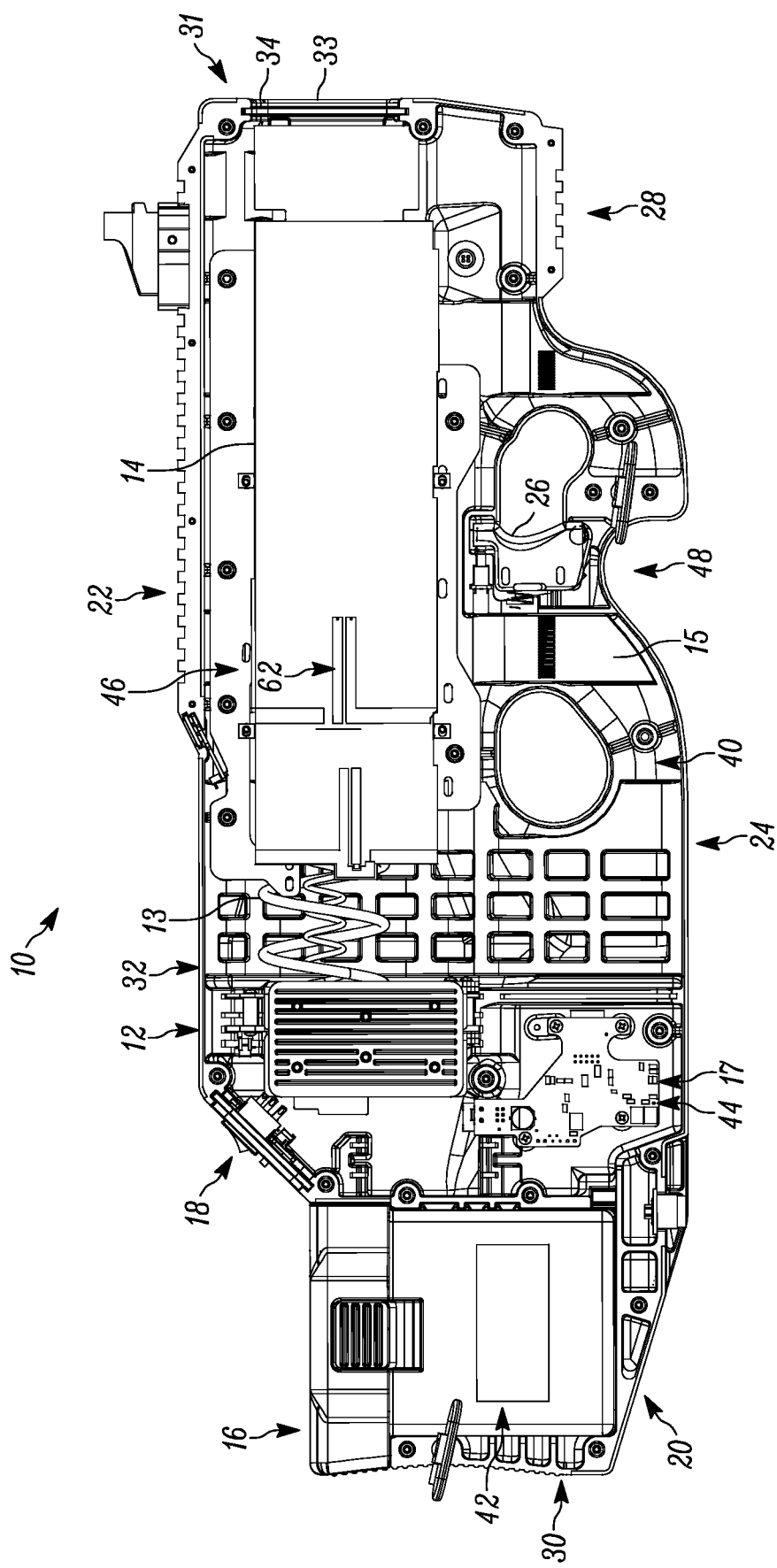
FIG. 4 of the drawings is a side elevational view of the anti-drone weapon as shown in FIG. 3.

The housing assembly 12, show in detail in FIGS. 1, 2, and 4, comprises a stock 20, barrel 22, grip 24, trigger 26, forearm 28, port half 36, starboard half 38, and cavity 40. Now, their interaction is to be understood as the substantial coupling and mating of various parts. The stock 20 comprises a butt 30. The barrel 22 comprises a distal end 31, proximal end 32, opening 33, and cover 34. The grip 24 comprises a thumbhole 35. The cavity comprises a power source region 42, circuitry region 44, barrel region 46, and grip region 48. The butt 30 of stock 20 is known to be the end of the anti-drone weapon 10 in that it is meant to rest against some surface including, but not limited to, a shoulder or other part of the body of the user.

The barrel 22 has distal end 31 and proximal end 32 substantially apart and opposite one another, with the extension of material between them defining the barrel 22. Proximal to the distal end 31 is an opening 33, defined by the absence of material surrounding the vertical plane of the anti-drone weapon. This opening further has a cover 34 which, when fully engaged, substantially covers the interior of the device, and preferably having low electromagnetic energy loss characteristics at the radio frequencies of operation. The proximal end 32 is proximal to the stock 20 and butt 30 system of the housing 12. It is to be understood the size of the opening, and the cover respectively, are variable and dependent upon the size of the housing and barrel system.

The grip 24 of the housing 12 is generally beneath the barrel 22 and is proximal to the proximal end 32 of the barrel 22. The grip 24 defines the thumbhole 35. The forearm 28 is generally beneath the barrel 22 and is positioned near to the distal end 31. The trigger 26 is situated substantially between the forearm 28 and grip 24 while also being generally beneath the barrel 22. It is to be understood by those skilled in the art that the grip 24, trigger 26, and forearm 28 are substantially aligned along the vertical plane in reference to one another, which generally allows for use by either right handed individuals or left handed individuals. With reference to the horizontal plane, the grip 24, trigger 26, and forearm 28 are all generally within the region of the distal end 31 and proximal end 32 of the barrel 22.

The housing 12 further is defined by two halves denoted as port half 36 and starboard half 38. The two halves are substantially coupled by a method including, but not limited to, screws, bolts, tight-fight locks, adhesive, or other such methods that substantially couple to parts together. When both halves are coupled together, they define the cavity 40, existing within the housing 12 of the device. The regions of the cavity include, among others, the power source region 42, proximal and substantially within the stock 20, the circuitry region 44, proximal and substantially between the grip 24 and stock 20, the barrel region 46, proximal and substantially within the barrel 22, and the grip region, proximal and substantially within the grip 24. It is to be understood by those skilled in the art the cavity 40 has size and dimensions dependent upon the size and thickness of the housing 12. Further, as the cavity 40 is known to be the location in which the antenna and circuitry assemblies are located, the cavity is to be suitably sized to allow all parts to be arranged within. The amount of vacant spaced defined between these assemblies is variable and subject to change in contemplated configurations of the device.

Figure 5:
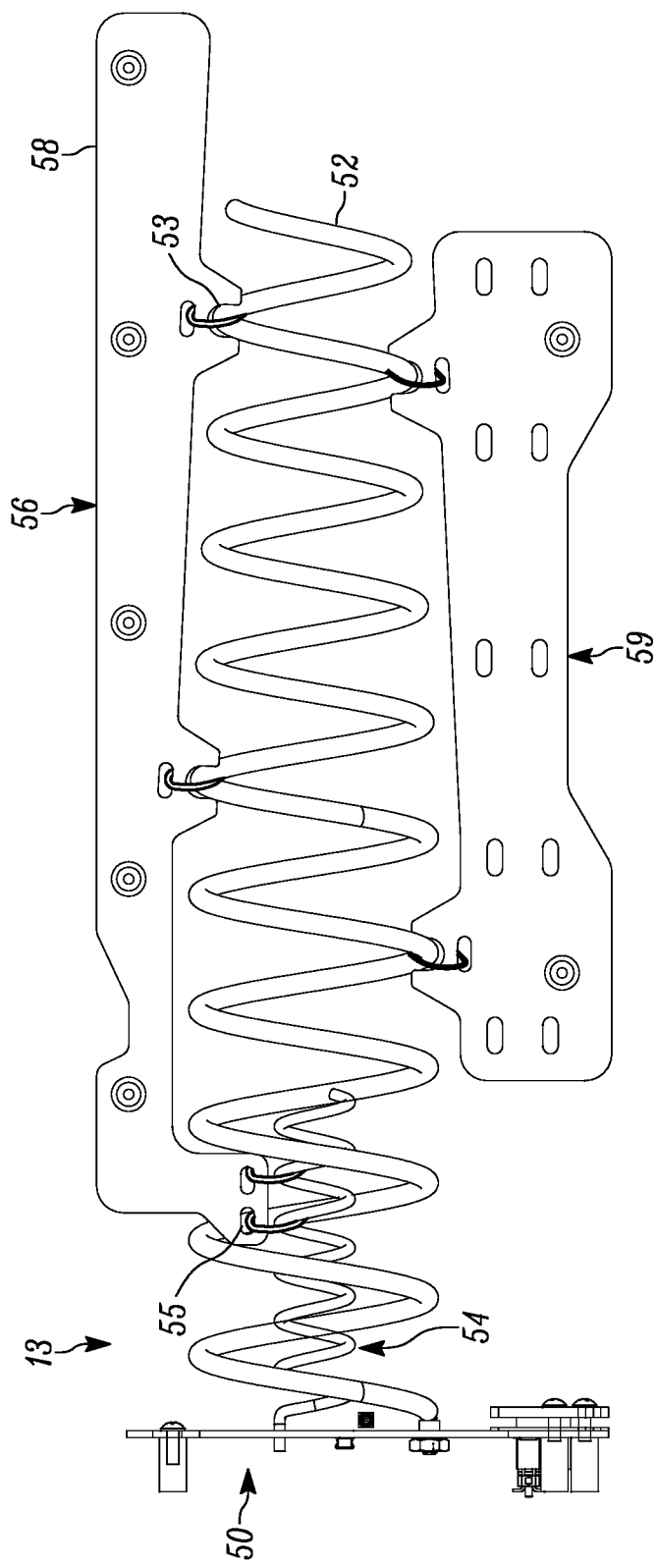
FIG. 5 of the drawings is a side-view of the helical antenna assembly.

The helical antenna assembly 13, shown best in FIG. 5, comprises grounding plate 50, outer helical antenna 52, inner helical antenna 54, and mounting assembly 56. The outer helical antenna 52 and inner helical antenna 54 are coupled to the grounding plate which is, through fasteners coupled to the housing. Both antennas are known to be substantially radially aligned in reference to one another. That is to say, the central axis of the outer helical antenna 52 and the inner helical antenna 54 are substantially aligned with reference to one another.

The mounting assembly 56 further comprises upper mounting bracket 58, consisting of outer helical interface 53 and inner helical interface 55, and lower mounting bracket 59, and generally comprises a polymer member having polymer ties coupling or extending around the helical windings. The mounting assembly 56 has upper mounting bracket 58 which couples substantially to the outer helical antenna 52 and inner helical antenna 54 along a number of defined by known points. The outer helical interface 53 couples the upper mounting bracket 58 to the outer helical antenna 52 and the inner helical interface 55 couples the inner helical antenna 54 to the upper mounting bracket 58. The lower mounting bracket 59 couples substantially to the outer helical antenna 52 along points that may or may not be identical to the upper mounting bracket 58. The upper mounting bracket 58 is situated substantially above the lower mounting bracket 59 with reference to the vertical plane. The number of mounting points which the upper mounting bracket 58 interacts with the outer helical antenna 52 and inner helical antenna 54 is variable and subject to change in contemplated configurations of the device. Further, the method of coupling the mounting assembly to the helical antenna systems may include methods such as, but not limited to, cable ties and the like.

The helical antenna assembly 13 is coupled and aligned substantially to the barrel 22 of the housing 12. This is done in such a way the central axis of the helical antennas extends through the opening 33 of the barrel 22. The grounding plate 50 substantially couples to the proximal end 32 of the barrel 22 and with the helical antenna systems extending towards the distal end 31 of the barrel 22. The upper mounting bracket 58 couples to the higher region of the barrel 22 and the lower mounting bracket 59 couples substantially to the lower region of the barrel 22. It is further to be understood that the helical antenna assembly 13 is of length substantially similar or less than the length of the barrel 22 in relation to the distance between the distal end 31 and proximal end 32.

Figure 6:
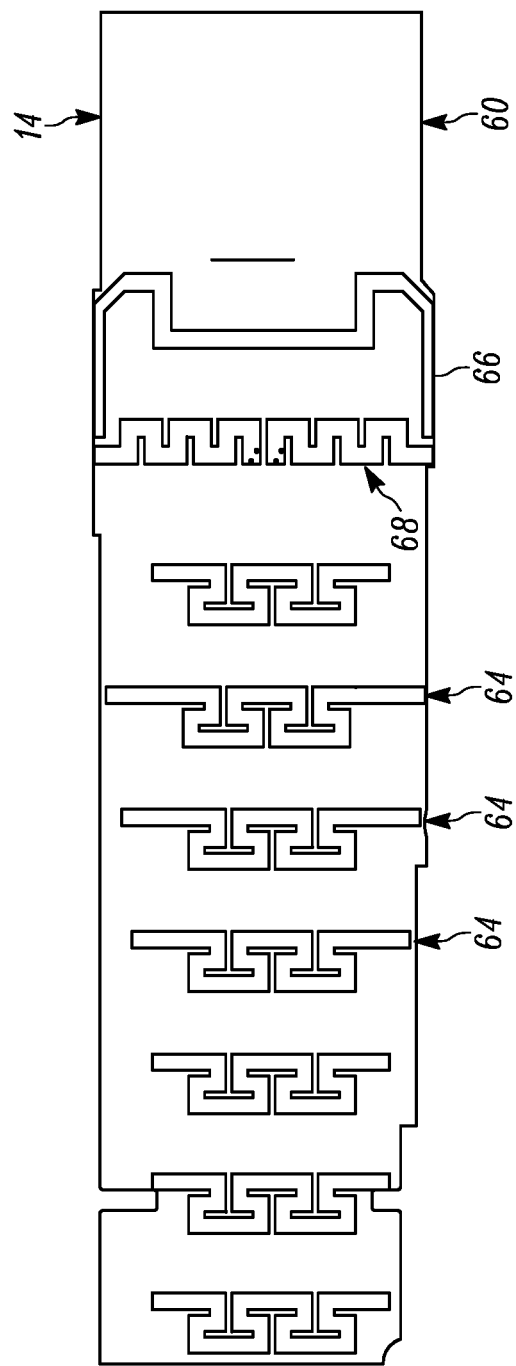
FIG. 6 of the drawings is a side-view of the second antenna assembly.

The second antenna assembly 14, shown best in FIGS. 4 and 6, comprises a substrate 60, leads 62, director 64, reflector 66, and driver element 68. In the configuration shown, the leads 62 are positioned on the substantially opposite surface as the plurality of directors 64, reflector 66 and driver element 68. The base 60 is the source of coupling for the second antenna assembly to the housing 12 and may be done through methods including, but not limited to, bolts, screws, adhesives, or other methods that substantially couple two parts together. The second antenna assembly 14 is coupled substantially to the starboard half 38 of the housing 12 by methods described previously within the barrel region 46 of the cavity 40. With reference to the helical antenna assembly 13, the second antenna assembly 14 is substantially in line with it with reference to its horizontal plane, and generally directed similarly down the barrel 22. Further, it is to be known the length of the second antenna assembly is substantially equal to or less than the barrel 22. In the configuration shown, the second antenna comprises a broadband quasi-yagi antenna.

Figure 8:
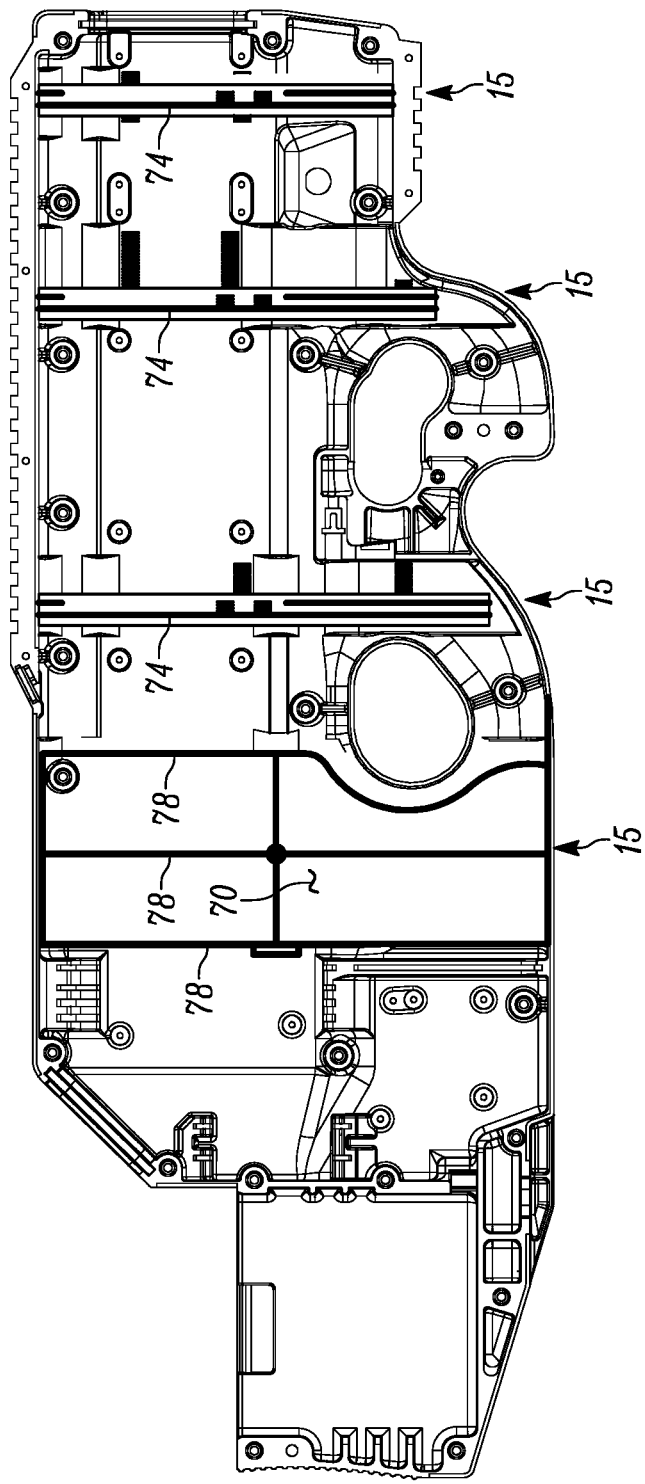
FIG. 8 of the drawings is a side-view of the third antenna assembly.

The third antenna assembly 15, as shown in FIG. 8, comprises a flexible substrate 70, directors 74, and elements 78. The third antenna is coupled to the port half of the housing 12 by methods described previously, within the barrel region 46 of the cavity 40. In the configuration shown, the third antenna comprises a directed log-periodic antenna that is positioned so as to be of multiple components that are arranged in a non-planar configuration, and which pass between the openings in the grip (thumbhole) and the trigger. It will be understood that certain modifications are made to the configuration to allow for the components to work around the openings in the housing and to operate therewithin, while maintaining the same within the confines of the housing. In the configuration shown, the third antenna components are all separated by a predetermined distance, but follow a substantially matching curvature to that of the cavity 40 surface.

Figure 7:
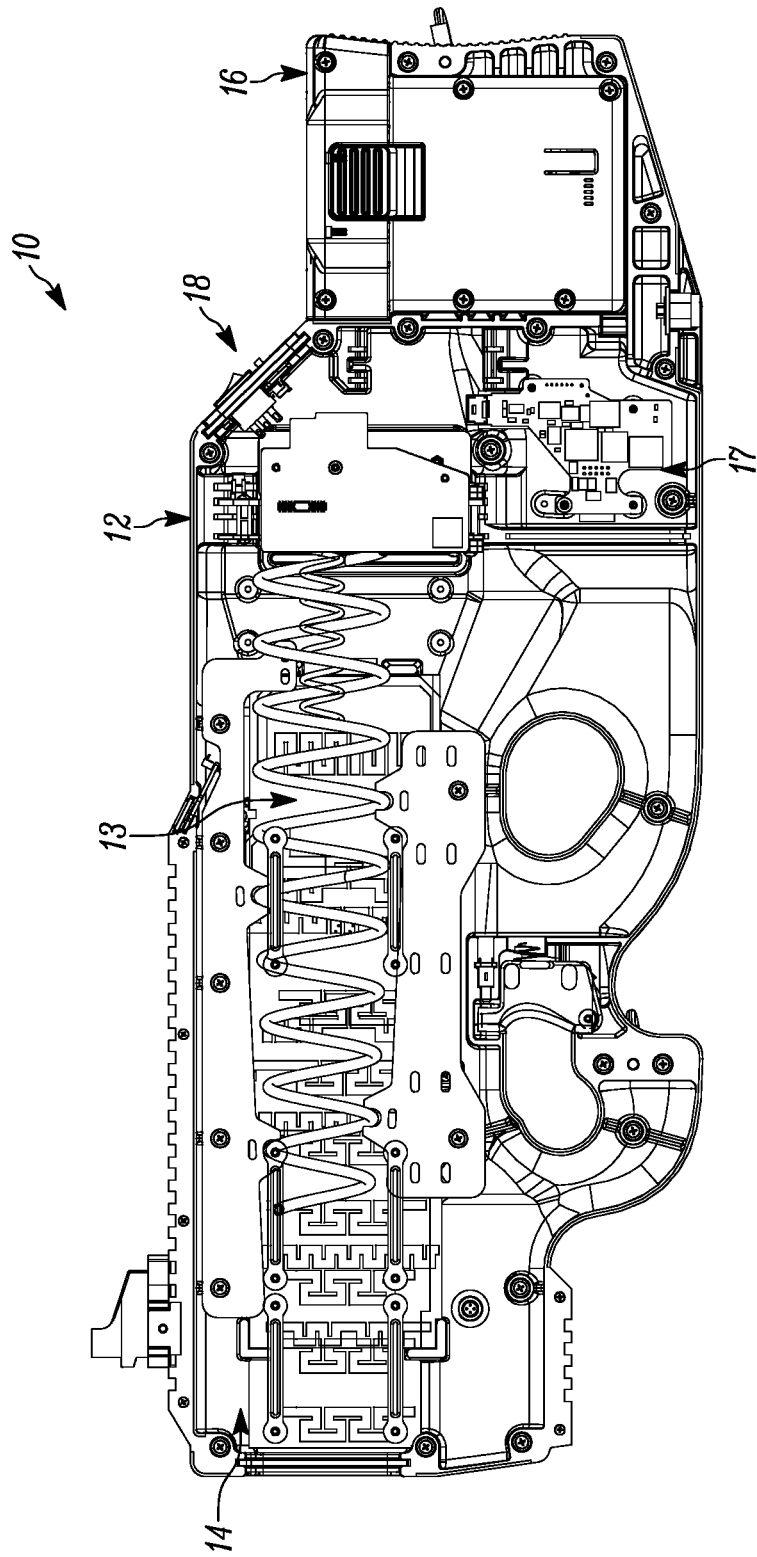
FIG. 7 of the drawings is a side elevational view of the anti-drone weapon having the port side housing portion removed.

The power supply 16, shown best in FIG. 7, is substantially coupled to the stock 20 of the housing 12 in the power source region 42 of the cavity 40. It is to be understood by those with skill in the art that the battery size may vary depending upon the housing size, intended use of the anti-drone weapon, length of operation, and other such factors. With respect to the exemplary figure, the power supply 16 is a rechargeable lithium ion battery and operates on suppling a 9-21V voltage range, allowing for one or more hours of continuous transmit operation or six or more hours of sensor receive operation. The length of times described may increase or decrease depending upon alterations or improvements made to the battery or device in future contemplated configurations. It will be understood that an additional battery pack or an external battery pack may be coupled to the weapon.

The processor and control circuitry 17, shown best in FIGS. 3, 4, and 7, is a multitude of electrical elements that control the operation of the device. These elements are mounted to the housing system 12 within the circuitry region 44 of the cavity 40. The method of mounting may include, but not be limited to, bolts, screws, soldering, or other methods of securing electrical devices. With regards to the control panel assembly 18, shown best in FIGS. 2, 3, 6, and 7, the assembly comprises user actuatable elements 80 and indicators 82. The positioning, number, and size of these elements are variable and subject to change in contemplated configurations of the device. It is to be understood by those with skill in the art that the user actuatable elements 80 are input devices that affect the anti-drone weapon 10 in some meaningful way with respect to what is available within the context of the elements. These elements may include, but are not limited to, powering the system, voltage regulation, operating frequency, and antenna assembly selection. The indicators 82 are output displays that may include, but are not limited, digital readings, lights, digital scales, or other such methods of indicating the system function. The control panel assembly 18 further interacts with the processor and control circuitry 17 in such a way that it provides both input to and receives output from the electrical elements described previously. It is contemplated that a software-defined waveform is utilized that is generated digitally, modified with analog circuitry, transformed to radio frequency through a radio frequency synthesis circuit, and further amplified and directed to the antenna. Of course, other waveforms are contemplated for amplification and direction to the antenna.

Described herein are the contemplated specifications for the anti-drone weapon 10. These specifications are dependent upon the materials used, available power supply, electrical system chosen, and other such parameters. These metrics may be altered in future configurations of the device such that the device can be used in situations either broader or more specified than already provided.

The anti-drone weapon in the configuration shown, generally weighs approximately 3.6 kg (preferably less than 6 kg) when fully assembled and can be operable by either left or right-handed users. It has operation temperatures between −20 to 40° C. with a preferred storage temperature range of −40 to 85° C. The housing seals the inner parts, including the antenna assemblies, power supply, processor and control circuitry from the environment. Further, the housing is ruggedized for shock and vibration abatement, such that sudden accelerations of the device will not result in substantial harm to the equipment existing within the cavity. Of course, these are merely exemplary, and other configurations are contemplated.

The antenna assemblies described previously operate in generally different frequency ranges, powered by the power supply. These frequency ranges are understood to be alterable and may change under a variety of circumstances including user input, power supply, range from target, and other such means. The helical antennas generally operate on ranges that include GNSS (including GPS, GLONASS, Galileo, and BeiDou) L1, GNSS L2, 1250 to 1290 MHz, 2.4 to 2.5 GHz, and 5.6 to 6 GHz frequencies. The second antenna generally operates at 870 to 928 MHz frequencies. The third antenna generally operates between 420 to 460 MHz frequencies. The weapon has an operational range of several hundred meters up to, preferably, 1,000 meters to address the majority of threats at a tactically advantageous standoff distance. Further, and preferably, the weapon is able to recognize and sense drones and pilot ground station equipment and activity at a range up to and including 3.2 kilometers in distance. Again, these comprise merely illustrative configurations, and it is contemplated that variations may be provided, including differently configured antenna and the like. It is contemplated that the frequency range of the antenna is between 400 MHz and 6 GHz and beyond. It will be understood that various configurations allow for such frequency range operation.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An anti-drone weapon comprising:
   a housing including a stock and a barrel extending therefrom, the barrel including a proximal end and a distal end, and a trigger;
   a first antenna, a second antenna and a third antenna each positioned within the barrel, the first, second, and third antennas capable of operating at frequencies at least between 400 MHz and 6 GHz,
   a first antenna comprising a double helical antenna having a base positioned at the proximal end and extending toward the distal end;
   the second antenna comprising a quasi-yagi antenna positioned to a first side of the double helical antenna and extending between the proximal end and the distal end;
   the third antenna comprising a directed log-periodic antenna positioned on a second side of the double helical antenna;
   with the trigger configured to selectively activate at least one of the first, second and third antenna.

2. The anti-drone weapon of claim 1 further comprising a power supply, processor and control circuitry and a control panel positioned within the housing, and electrically coupled to the first, second, and third antenna, as well as to the trigger.

3. The anti-drone weapon of claim 1 wherein the double helical antenna is coupled to the barrel between the proximal and distal end through at least one of an upper mounting bracket and a lower mounting bracket.

4. The anti-drone weapon of claim 1 wherein the third antenna comprises a non-planar configuration.

5. The anti-drone weapon of claim 4 wherein the housing further includes a thumbhole spaced apart from the trigger, wherein a portion of the third antenna extends between the trigger and the thumbhole.

6. The anti-drone weapon of claim 1 wherein the first antenna operates on ranges that include GNSS (including GPS, GLONASS, Galileo, and BeiDou) L1, GNSS L2, 1250 to 1290 MHz, 2.4 to 2.5 GHz, and 5.6 to 6 GHz frequencies.

7. The anti-drone weapon of claim 1 wherein the second antenna operates at frequencies between 870 to 928 MHz.

8. The anti-drone weapon of claim 1 wherein the third antenna operates at frequencies between 420 to 460 MHz.

9. The anti-drone weapon of claim 1 wherein the anti-drone weapon weighs approximately 6 kilograms or less.

10. The anti-drone weapon of claim 1 having a range of approximately 1000 meters.

11. The anti-drone weapon of claim 1 wherein the housing is formed from a port case half and a starboard case half which are coupled together between a proximal and distal end thereof.

12. The anti-drone weapon of claim 1 wherein the housing defines a power source region that is substantially within the stock of the housing.

13. The anti-drone weapon of claim 1 wherein the helical antenna is spaced apart from the housing.

14. The anti-drone weapon of claim 1 wherein the housing comprises a polymer material.

* * * * *